US012744223B2

(12) United States Patent
Okubo

(10) Patent No.: US 12,744,223 B2
(45) Date of Patent: Sep. 22, 2026

(54) SURFACE MODIFIED OXYGEN REDUCTION ELECTROCHEMICAL CATALYSTS

(71) Applicant: Toyota Motor Engineering & Manufacturing North America, Inc., Plano, TX (US)

(72) Inventor: Keiichi Okubo, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 541 days.

(21) Appl. No.: 18/205,695

(22) Filed: Jun. 5, 2023

(65) Prior Publication Data

US 2024/0274839 A1 Aug. 15, 2024

Related U.S. Application Data

(60) Provisional application No. 63/443,787, filed on Feb. 7, 2023.

(51) Int. Cl.
*H01M 4/90* (2006.01)
*H01M 4/92* (2006.01)
*H01M 8/10* (2016.01)

(52) U.S. Cl.
CPC ....... *H01M 4/9008* (2013.01); *H01M 4/9083* (2013.01); *H01M 4/926* (2013.01); *H01M 2008/1095* (2013.01)

(58) Field of Classification Search
CPC ....... Y02E 60/50; B01J 21/18; B01J 23/8913; B01J 23/892; B01J 31/0244; B01J 31/08;
(Continued)

(56) References Cited

U.S. PATENT DOCUMENTS

2021/0384524 A1 12/2021 Asahi
2022/0416258 A1* 12/2022 Asahi .................. H01M 4/9058

FOREIGN PATENT DOCUMENTS

CN 105312087 A * 2/2016
CN 109950566 A * 6/2019 ............ Y02E 60/50
(Continued)

OTHER PUBLICATIONS

Asahi, M., et al. "Facile Approach to Enhance Oxygen Reduction Activity by Modification of Platinum Nanoparticles by Melamine-Formaldehyde Polymer," Journal of The Electrochemical Society, 166 (8), 2019, pp. 498-505. (Year: 2019).*
(Continued)

*Primary Examiner* — Christina A Johnson
*Assistant Examiner* — Mordecai M Leavitt
(74) *Attorney, Agent, or Firm* — Christopher G. Darrow; Darrow Mustafa PC

(57) ABSTRACT

A catalyst includes a metal on carbon (Me/C) particle with a surface modified with a plurality of immobilized planar six-membered benzene-like rings having at least three functional groups ($R_1$-$R_3$), and up to seven functional groups ($R_4$-$R_7$). The plurality of immobilized planar six-membered benzene-like rings can be a plurality of immobilized triazine rings. The $R_1$ functional group is bonded to or provides a bond with the Me/C particle and is selected from O, COO, NH, $NR_4$, S, an alkylamino group having 1 to 10 carbon atoms, an alkyl group having 1 to 10 carbon atoms, and a perfluoro alkyl group having 1 to 10 carbon atoms.

20 Claims, 6 Drawing Sheets

(58) Field of Classification Search
CPC .. B01J 35/45; B01J 35/60; H01M 2008/1095; H01M 4/9008; H01M 12/08; H01M 4/8663; H01M 4/8668; H01M 4/921; H01M 4/925; H01M 4/926; H01M 8/1018; H01M 2300/0082; H01M 4/62; H01M 4/865; H01M 4/9083; H01M 4/92; H01M 4/923; H01M 8/1039; H01M 4/9016
See application file for complete search history.

(56) References Cited

FOREIGN PATENT DOCUMENTS

| | | | | |
|---|---|---|---|---|
| CN | 111841600 | A | 10/2020 | |
| WO | 2019221156 | A1 | 11/2019 | |
| WO | WO-2021090746 | A1 * | 5/2021 | .......... H01M 4/9008 |

OTHER PUBLICATIONS

Wang et al. "Nano-grade composite catalyst, and preparation method and application thereof." English Machine Translation of Patent No. CN-105312087-A, document published Feb. 10, 2016. (Year: 2016).*

Yamazaki et al., "Sulphonated melamine polymer for enhancing the oxygen reduction reaction activity and stability of a Pt catalyst," Journal of Electroanalytical Chemistry, vol. 908, Mar. 1, 2022, pp. 1-7.

Yamazaki et al., "Creation of a Highly Active Pt/Pd/C Core-Shell-Structured Catalyst by Synergistic Combination of Intrinsically High Activity and Surface Decoration with Melamine or Tetra-(tert-butyl)-tetraazaporphyrin," ACS Catal. 2020, 10, pp. 14567-14580.

* cited by examiner

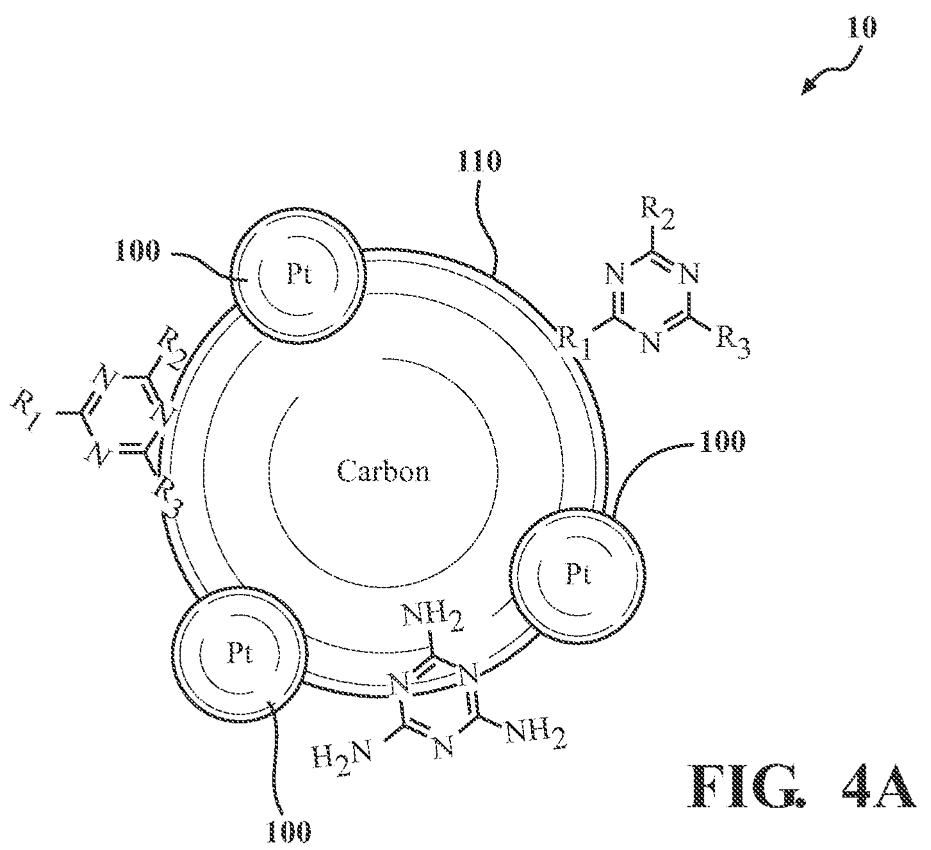
FIG. 4A
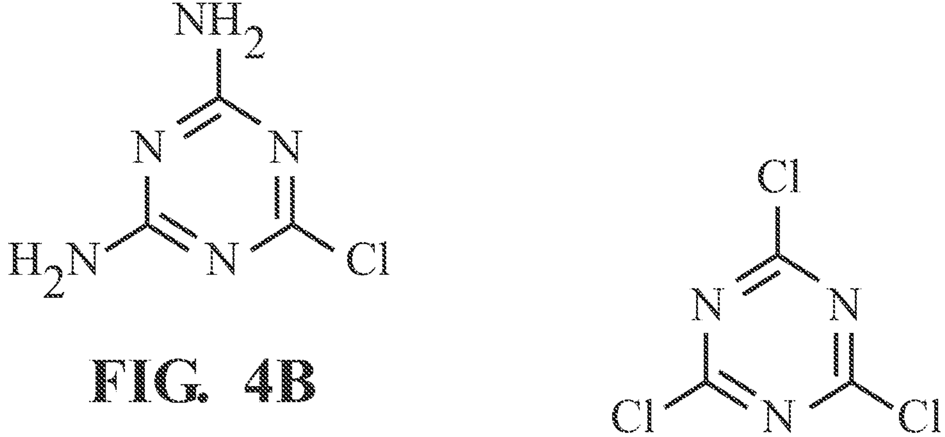
FIG. 4B
FIG. 4C

SURFACE MODIFIED OXYGEN REDUCTION ELECTROCHEMICAL CATALYSTS

CROSS-REFERENCE TO RELATED APPLICATIONS

This application claims the benefit of U.S. Provisional Application No. 63/443,787, filed Feb. 7, 2023, which is incorporated herein in its entirety by reference.

TECHNICAL FIELD

The present disclosure generally relates to catalysts and, more particularly, to catalysts for oxygen reduction.

BACKGROUND

Fuel cells provide power for transportation, material handling, and backup power stations. And a hydrogen fuel cell produces power by combining hydrogen and oxygen atoms at a cathode of the fuel cell via the oxygen reduction reaction (ORR) $O_2+4e^-+4H^+\rightarrow 2H_2O$. In addition, metal-air batteries provide power via the ORR. However, the ORR has relatively slow chemical kinetics and thus catalytic materials (e.g., platinum) are generally used to increase the rate of the ORR.

The present disclosure addresses issues related to ORR in hydrogen fuel cells, among other issues related to catalysts and fuel cells.

SUMMARY

This section provides a general summary of the disclosure, and is not a comprehensive disclosure of its full scope or all of its features.

In one form of the present disclosure a catalyst includes a metal containing particle on a carbon support (Me/C particle) and a surface of the Me/C particle is modified with a plurality of immobilized planar six-membered benzene-like rings with at least one nitrogen atom and having at least three functional groups $R_1$, $R_2$, and $R_3$. The Me/C particle has an oxygen reduction catalytic activity and $R_1$ is bonded to the Me/C particle (i.e., bonded to the carbon support of the Me/C particle) and selected from the group consisting of O, COO, NH, $NR_4$, S, an alkylamino group having 1 to 10 carbon atoms, an alkyl group having 1 to 10 carbon atoms, and a perfluoro alkyl group having 1 to 10 carbon atoms, and where $R_4$ is a functional group.

In another form of the present disclosure, a catalyst includes a Me/C particle having an oxygen reduction catalytic activity and a surface of the Me/C particle modified with a plurality of immobilized planar six-membered benzene-like rings with at least one nitrogen atom and having at least three functional groups $R_1$, $R_2$, and $R_3$. The $R_1$ functional group is bonded to the Me/C particle and selected from the group consisting of O, COO, NH, $NR_4$, S, an alkylamino group having 1 to 10 carbon atoms, an alkyl group having 1 to 10 carbon atoms, and a perfluoro alkyl group having 1 to 10 carbon atoms, and $R_2$ and $R_3$ are independently selected from the group consisting of $NH_2$, $NR_4H$, $NR_4R_5$, H, OH, F, Cl, Br, I, SH, an alkylamino group having 1 to 10 carbon atoms, an alkyl group having 1 to 10 carbon atoms, and a perfluoro alkyl group having 1 to 10 carbon atoms, and where $R_4$ and $R_5$ are functional groups.

In still another form of the present disclosure, a catalyst includes a platinum containing particle on a carbon support (Pt/C particle) having an oxygen reduction catalytic activity, and a surface of the Pt/C particle is modified with a plurality of immobilized triazine rings having a chemical structure selected from at least one of:

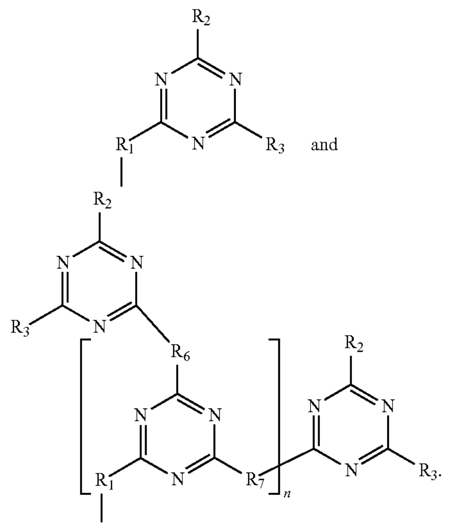

Also, $R_1$ is bonded to the Me/C particle and selected from the group consisting of O, COO, NH, $NR_4$, S, an alkylamino group having 1 to 10 carbon atoms, an alkyl group having 1 to 10 carbon atoms, and a perfluoro alkyl group having 1 to 10 carbon atoms, and $R_2$ and $R_3$ are independently selected from the group consisting of $NH_2$, $NR_4H$, $NR_4R_5$, H, OH, F, Cl, Br, I, SH, an alkylamino group having 1 to 10 carbon atoms, an alkyl group having 1 to 10 carbon atoms, and a perfluoro alkyl group having 1 to 10 carbon atoms, and where $R_4$ and $R_5$ are functional groups.

Further areas of applicability and various methods of enhancing the disclosed technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 4A shows a Pt/C catalyst with immobilization surface modifiers according to the teachings of the present disclosure;

FIG. 4B shows one example of an immobilization surface modifier for a Pt/C catalyst according to the teachings of the present disclosure;

FIG. 4C shows another example of an immobilization surface modifier for Pt/C catalyst according to the teachings of the present disclosure;

Figure 1:
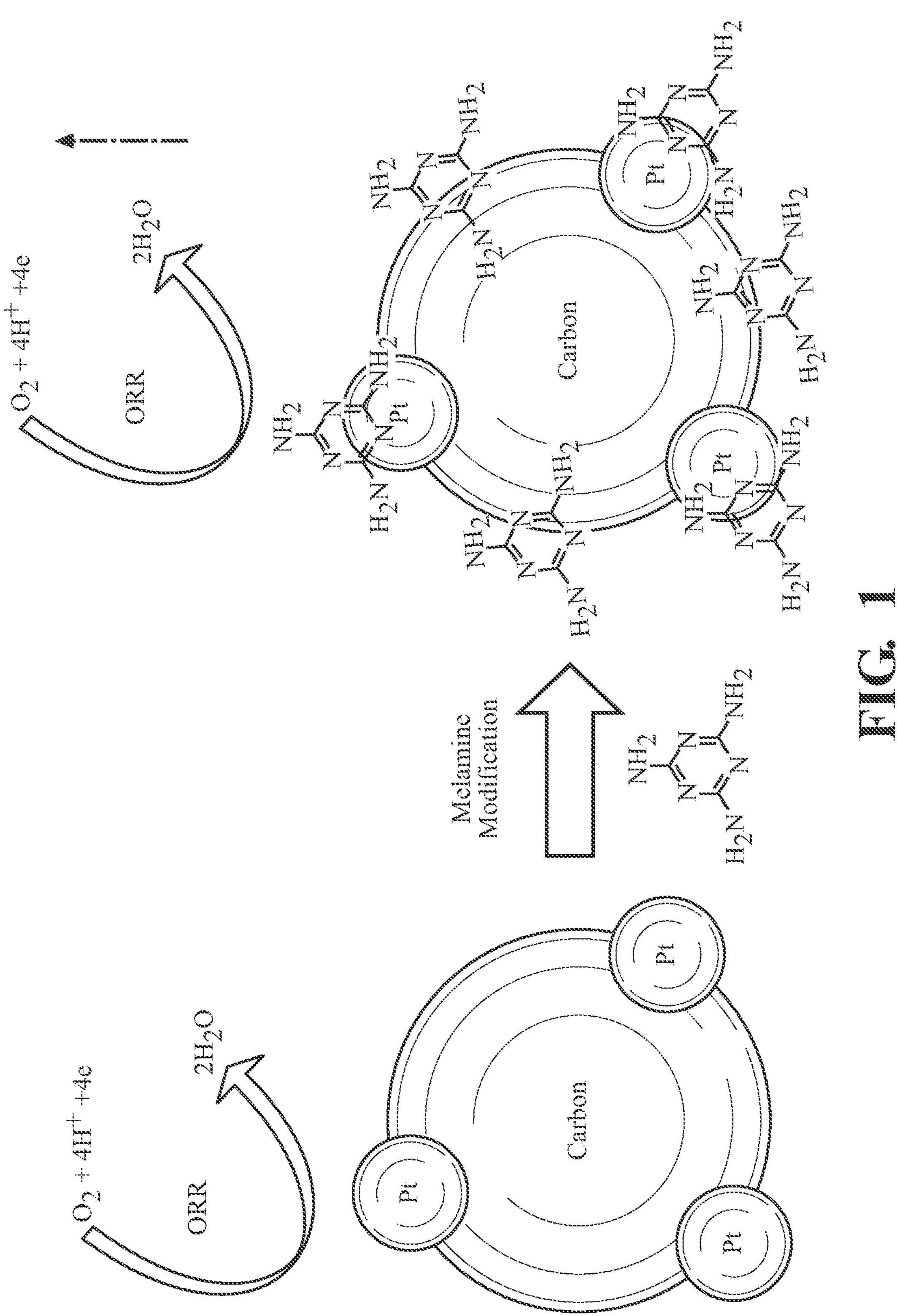
FIG. 1 shows an unmodified platinum on carbon (Pt/C) catalyst and a melamine surface modified Pt/C catalyst catalyzing the oxygen reduction reaction (ORR)

It should be noted that the figures set forth herein are intended to exemplify the general characteristics of the chemical compounds, materials, and catalysts among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide improved catalysts for the oxygen reduction reaction (ORR) in hydrogen fuel cells and/or metal-air batteries. In the alternative, or in addition to, the present teachings provide improved catalysts for water hydrolysis. The catalysts include metal containing particles (also referred to herein simply as "metal particles") having an oxygen reduction catalytic activity and the metal of or in the metal containing particles can be platinum, ruthenium, iridium, rhodium, palladium, osmium, tungsten, lead, iron, chromium, cobalt, nickel, manganese, vanadium, molybdenum, gallium, aluminum, lanthanum, cerium, prascodymium, neodymium, samarium, gadolinium, yttrium, zirconium, titanium, copper, silver, gold, and alloys thereof, among others. In addition, the metal can be in the form of an oxide, a nitride, a sulfide, or a phosphide.

In some variations, the metal particle can be at least one of a platinum particle, a platinum alloy particle, and a composite particle containing platinum. For example, platinum alloy particles include particles with platinum alloyed with one or more of ruthenium, iridium, rhodium, palladium, osmium, tungsten, lead, iron, chromium, cobalt, nickel, manganese, vanadium, molybdenum, gallium, aluminum, lanthanum, cerium, praseodymium, neodymium, samarium, gadolinium, yttrium, zirconium, titanium, copper, silver, gold, and alloys thereof.

In variations where the metal particle includes a platinum alloy, the element ratio of the alloying addition (i.e., the metal(s) other than the platinum) is not particularly limited, but in some variations can be between about 0.11 atom % (at %) and about 50 at %. In addition, the average particle diameter (also known as the "particle size") of the metal particles is not particularly limited, but in some variations can be between about 1 nanometer (nm) to about 5000 nm, for example, between about 1 nm and about 1000 nm, between about 1 nm and about 500 nm, between about 1 nm and about 250 nm, or between about 1 nm and about 100 nm.

In some variations, the metal particles are supported on a carbon support (e.g., a carbon particle). And in such variations, the carbon may be carbon black (acetylene black, Ketjen black, furnace black, or the like), activated carbon, graphite, glassy carbon, graphene, carbon fiber, carbon nanotube, carbon nitride, carbon sulfide, or carbon phosphide, or a mixture or the like containing at least two of these carbon materials.

In some variations, the catalysts include metal particles on a carbon support (Me/C particles) and the Me/C particles have a surface that is modified with surface modifiers that enhance the ORR catalytic activity of the Me/C particles. That is, the Me/C catalyst is a surface modified catalyst. And in at least one variation, the catalysts include platinum particles on a carbon support (also known as platinum on carbon (Pt/C)) and the Pt/C catalyst is surface modified. For example, in some variations the surface modified Pt/C catalyst includes immobilization surface modifiers that retard or reduce desorption of surface modifiers from Pt/C catalyst particles.

Referring to FIG. 1, an illustration of two Pt/C catalyst particles catalyzing the ORR is shown. The Pt/C catalyst particles both include Pt particles (e.g., Pt nanoparticles) supported on a carbon support (e.g., carbon particles). The Pt/C catalyst particle on the left hand side of FIG. 1 is an unmodified Pt/C catalyst particle, and the Pt/C catalyst particle on the right hand side of FIG. 1 is a Pt/C catalyst particle with its surface modified with melamine (hereafter referred to as a "melamine surface modified Pt/C particle"). And as illustrated by the arrow adjacent to the ORR reaction for the melamine surface modified Pt/C catalyst particle on the right hand side of FIG. 1, the melamine surface modified Pt/C particle enhances the ORR reaction compared to the unmodified Pt/C particle. That is, a melamine surface modified Pt/C catalyst material provides or exhibits an increase in catalytic activity with respect to the ORR when compared to an unmodified Pt/C catalyst material.

Figure 2:
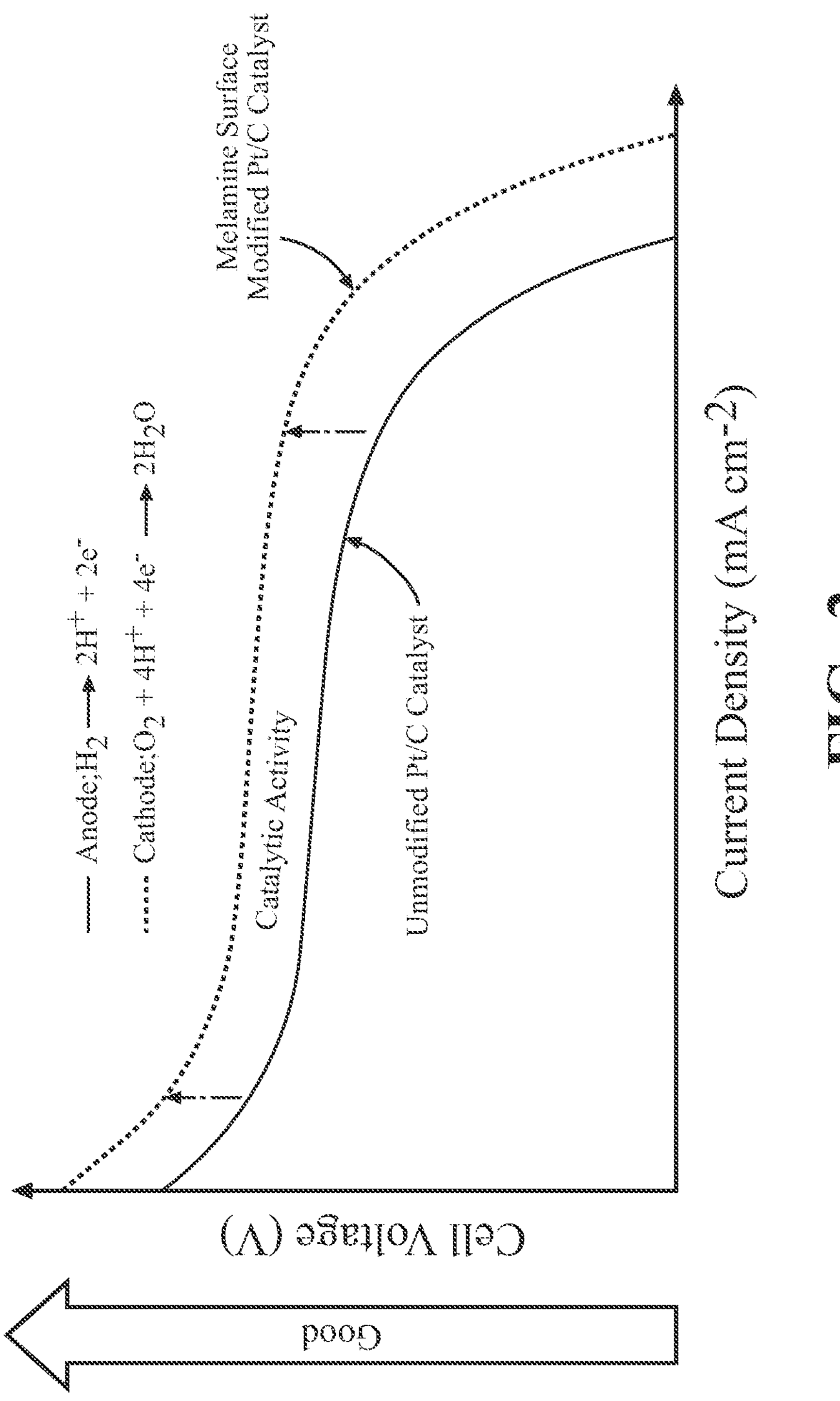
FIG. 2 shows a graphical plot of cell voltage versus current density for a fuel cell with an unmodified Pt/C catalyst and a fuel cell with a melamine surface modified Pt/C catalyst.

For example, and with reference to FIG. 2, a graphical plot of cell voltage as a function of current density for a fuel cell having or using a cathode with an unmodified Pt/C catalyst for catalyzing the ORR, and a fuel cell having or using a cathode with a melamine surface modified Pt/C catalyst for catalyzing the ORR is shown. And as observed from FIG. 2, the melamine surface modified Pt/C catalyst provides enhanced or increased catalytic activity compared to the unmodified Pt/C catalyst. It should be understood that such an increase in catalytic activity provided by the melamine surface modified Pt/C catalyst can result in a decrease in the amount of Pt needed within a fuel cell and thereby result in a reduction in cost for such a fuel cell.

Figures 3A, 3B:
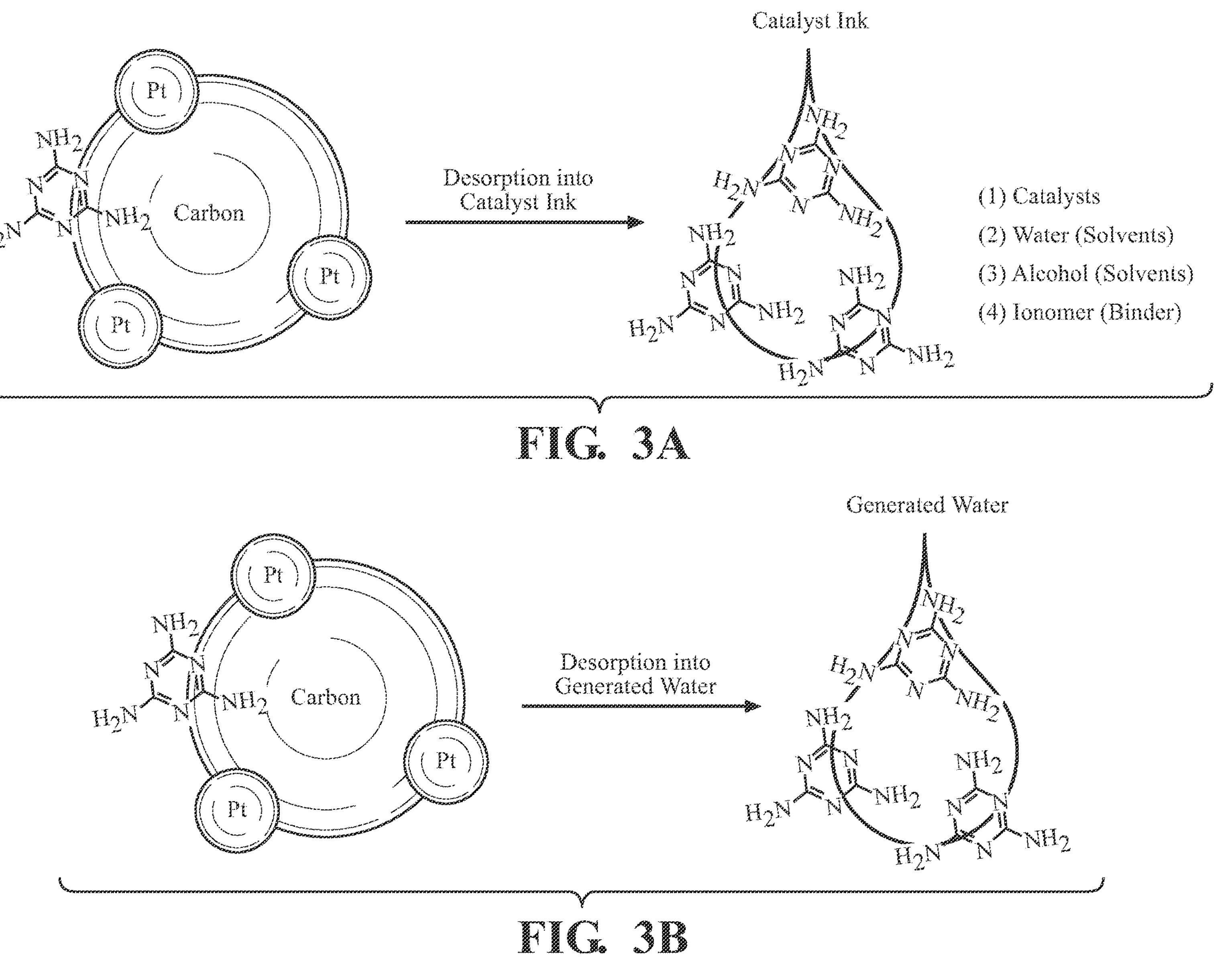
FIG. 3A illustrates desorption of melamine from a melamine surface modified Pt/C catalyst into a catalysts ink used for the manufacture of fuel cells.
FIG. 3B illustrates desorption of melamine from a melamine surface modified Pt/C catalyst into water generated during operation of fuel cells.

However, and with reference to FIGS. 3A-3B, desorption of melamine from melamine surface modified Pt/C catalyst particles can occur and thereby reduce the catalytic activity with respect to the ORR. For example, FIG. 3A illustrates melamine from a melamine surface modified Pt/C catalyst particle being desorbed into catalyst ink used for the manufacture of fuel cells. In some variations, a catalyst ink will include melamine surface modified Pt/C catalyst particles, solvents (e.g., water, alcohol, among others), and an ionomer, and melamine desorbs from the melamine surface modified Pt/C catalyst particles into the solvent(s). In the alternative, or in addition to, melamine from a melamine surface modified Pt/C catalyst particle is desorbed into water (FIG. 3B) formed from the ORR during operation of a fuel cell.

Referring now to FIG. 4A, a surface modified Pt/C catalyst particle 10 according to the teachings of the present disclosure is shown. The surface modified Pt/C catalyst particle 10 includes Pt particles 100 (e.g., nanoparticles) on a carbon support particle 110 (hereafter referred to herein simply as "carbon particle 110" or "carbon particle"), and one or more six-membered benzene-like rings with at least one nitrogen atom and one or more functional groups. Particularly, the surface of the carbon particle 110 is modified with triazine rings having one or more functional groups.

Figure 4D:
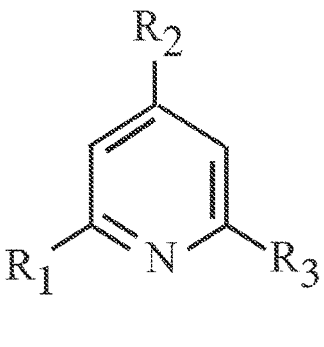
FIG. 4D shows one chemical structural model of an immobilization surface modifier for a Pt/C catalyst according to the teachings of the present disclosure.
Figure 4E:
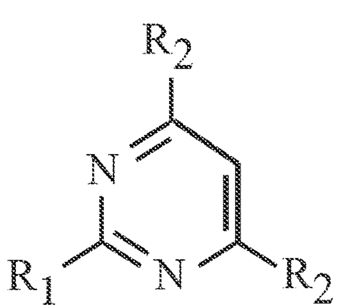
FIG. 4E shows another chemical structural model of an immobilization surface modifier for a Pt/C catalyst according to the teachings of the present disclosure.

Referring to FIG. 4B, one example of a six-membered benzene-like ring in the form of a triazine ring with two primary amine functional groups and one chloride functional group is shown, and FIG. 4C shows one example of a six-membered benzene-like rings in the form of a triazine ring with three chloride functional groups. Accordingly, in some variations a plurality of immobilized planar six-membered benzene-like rings includes a plurality of immobilized triazine rings having at least one halogen functional group (e.g., a fluoro, chloro, bromo, and/or iodo functional group). And while FIGS. 4A-4C show triazine rings as immobilization surface modifiers, in some variations the immobilization surface modifiers are not triazine rings. For example, and with reference to FIGS. 4D-4E, in at least one variation the surface of the carbon particle 110 is modified with a six-membered benzene-like ring with one nitrogen atom (i.e., pyridine) and three functional groups (FIG. 4D), and in some variations the surface of the carbon particle 110 is modified with a six-membered benzene-like ring with two nitrogen atoms (i.e., pyrimidine) and three functional groups (FIG. 4E). As used herein, the phrase "six-membered benzene-like ring" refers to a molecule with a planar six-membered ring structure similar to benzene but with at least one of the carbon atoms in the benzene ring structure replaced with a nitrogen atom.

Figure 5A:
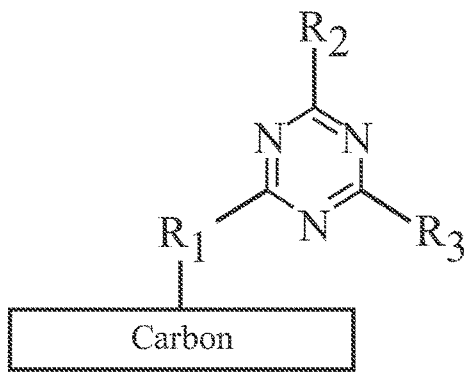
FIG. 5A shows one chemical structural model of an immobilization surface modifier for a Pt/C catalyst bonded to a carbon support according to the teachings of the present disclosure.
Figure 5B:
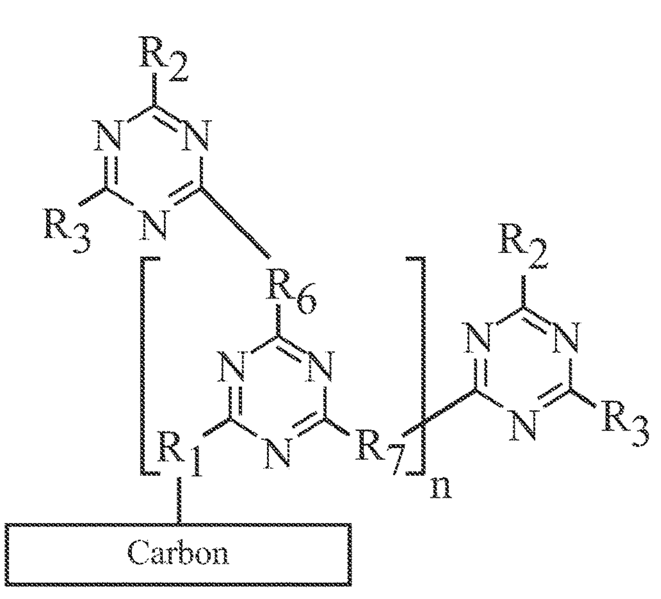
FIG. 5B shows another chemical structural model of an immobilization surface modifier for a Pt/C catalyst bonded to a carbon support according to the teachings of the present disclosure.

Referring to FIGS. 5A-5B, FIG. 5A shows a generalized chemical structure of a triazine ring with three functional groups ($R_1$, $R_2$. $R_3$) bonded to a carbon support (e.g., a carbon particle), i.e., the triazine ring has three functional groups and is bonded to the carbon support via one of the functional groups, and FIG. 5B shows a generalized chemical structure of three triazine rings with seven functional groups ($R_1$-$R_7$) bonded to a carbon support.

Referring specifically to FIG. 5A, in some variations, $R_1$ can be selected from O, COO, NH, $NR_4$, S, an alkylamino group having 1 to 10 carbon atoms, an alkyl group having 1 to 10 carbon atoms, and a perfluoro alkyl group having 1 to 10 carbon atoms, among others, and where $R_4$ is a functional group as described below. Also, $R_2$ and $R_3$ can be independently selected from $NH_2$, $NR_4H$, $NR_4R_5$, H, OH, F, Cl, Br, I, SH, an alkylamino group having 1 to 10 carbon atoms, an alkyl group having 1 to 10 carbon atoms, or a perfluoro alkyl group having 1 to 10 carbon atoms, among others, and where $R_4$ and $R_5$ can be independently selected from one of an alkylamino group having 1 to 10 carbon atoms, an alkyl group having 1 to 10 carbon atoms, a perfluoro alkyl group having 1 to 10 carbon atoms, OH, F, Cl, Br, I, SH, and $NH_2$, among others.

Referring specifically to FIG. 5B, $R_1$, $R_2$, $R_3$, $R_4$, and $R_5$ can be the same as identified above with respect to FIG. 5A, and $R_6$ and $R_7$ can be independently selected from O, S, COO, CO. CONH, $CONR_8$, and $R_8$, where $R_8$ can be an alkylamino group having 1 to 10 carbon atoms, or an alkyl group having 1 to 10 carbon atoms, a perfluoro alkyl group having 1 to 10 carbon atoms, OH, F. Cl, Br, I, SH, and $NH_2$, among others. In the alternative, $R_6$ and/or $R_7$ can be blank, i.e., two triazine rings can be directly bonded to each other. And in some variations, 'n' can be between 1 and 10000, inclusive, such that a polymer type surface modifier is present. And while not shown in FIGS. 5A-5B, it should be understood that a six-membered benzene-like ring with only one nitrogen atom (i.e., pyridine) as shown in FIG. 4D and/or a six-membered benzene-like ring with two nitrogen atoms (i.e., pyrimidine) as shown in FIG. 4E can be bonded to the carbon support via one of the functional groups $R_1$, $R_2$, $R_3$.

Figure 6:
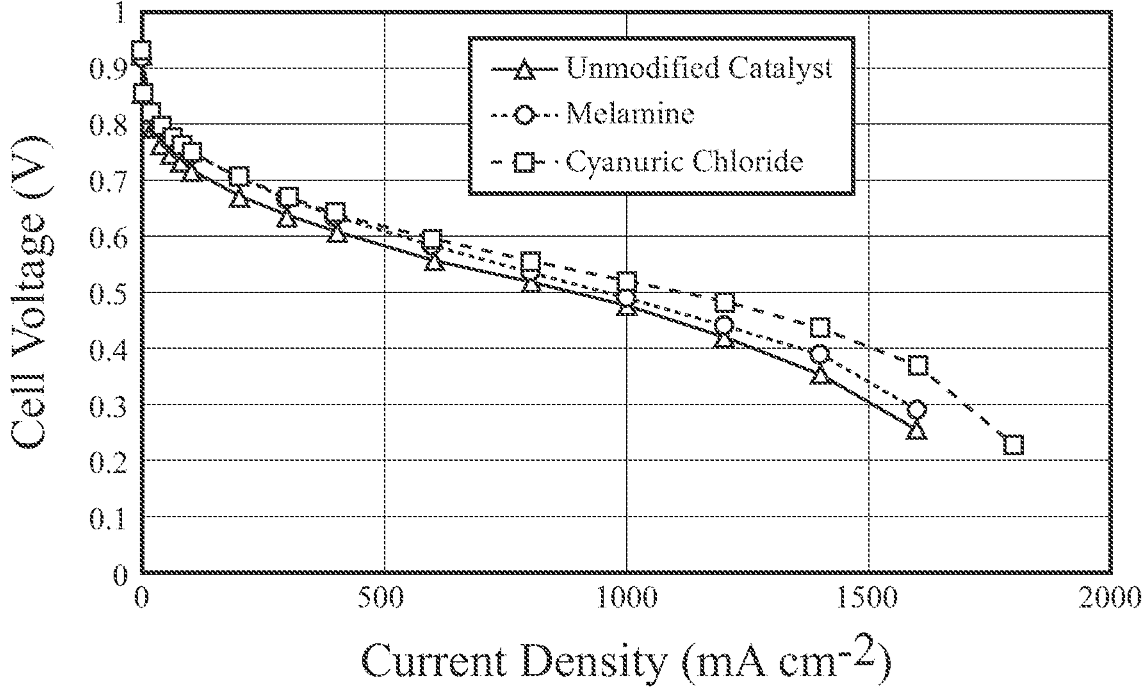
FIG. 6 shows a graphical plot of cell voltage versus current density for a fuel cell with an unmodified Pt/C catalyst, a fuel cell with a melamine surface modified Pt/C catalyst, and a fuel cell with a cyanuric chloride surface modified Pt/C catalyst according to the teachings of the present disclosure.

Referring now to FIG. 6, performance of an immobilized surface modified Pt/C catalyst according to the teachings of the present disclosure compared to an unmodified Pt/C catalyst and a melamine surface modified Pt/C catalyst is shown. Particularly, FIG. 6 is a graphical plot of cell voltage versus current density for an inventive fuel cell with a cyanuric chloride surface modified Pt/C catalyst, a comparative fuel cell with an unmodified Pt/C catalyst, and a fuel cell with a melamine surface modified Pt/C catalyst. And as observed from FIG. 6, the fuel cell with the cyanuric chloride surface modified Pt/C catalyst exhibited an increase in cell voltage compared to the fuel cell with the unmodified Pt/C catalyst and the fuel cell with the melamine surface modified Pt/C catalyst. Not being bound by theory, the enhanced performance of the fuel cell with the cyanuric chloride surface modified Pt/C catalyst is the result of a decrease in desorption of the triazine rings from the Pt/C catalyst material compared to the other two Pt/C catalysts. For example, the cyanuric chloride molecules replace a chloride functional group with a covalent bond, hydrogen bond, or ionic bond with a carbon support and/or Pt particle such that the Pt/C catalyst maintains a high catalytic activity for longer time periods compared to the unmodified Pt/C catalyst and the melamine surface modified Pt/C catalyst. Stated differently, the results shown in FIG. 6 illustrate hydrogen fuel cells utilizing immobilized surface modified catalysts according to the teachings of the present disclosure have superior activity compared to those utilizing state-of-the-art catalysts.

The present disclosure is further illustrated with respect to the following examples. It should be understood that these examples are provided to illustrate specific embodiments of the present invention and should not be construed as limiting the scope of the present invention.

Example 1. Synthesis of Unmodified Pt/C Catalyst

The unmodified Pt/C catalyst was synthesized by first mixing 3.36 milligrams (mg) of Pt/C particles having 47.2 wt. % Pt with 200 mL of a water-THF solution to form a catalyst solution. The Pt/C catalyst was obtained from Tanaka Kikinzoku Kogyo K.K. in the form of Pt nanoparticles deposited on carbon (TEC10V50E). The catalyst solution was heated to 323 K (50° C.) for 2 hours, and cooled to and held at room temperature (293 K-20° C.) for 16 hours in a nitrogen atmosphere to form a catalyst powder. The catalyst powder was then washed 4 times and collected by centrifugation, followed by drying at 323 K (50° C.) for 18 hours to form a catalyst ink. It should be understood that THF was present in the catalyst solution due to the reactivity of chlorine with water and the presence of THF may not be needed for other non-chlorine and/or non-halide functional groups.

Example 2. Synthesis of Melamine Surface Modified Pt/C Catalyst

The melamine modified Pt/C catalyst was synthesized by first mixing 3.36 grams (mg) of Pt/C particles having 47.2 wt. % Pt with 200 mL of a water-THF solution and 200 mmol of melamine to form a catalyst solution. The Pt/C catalyst was obtained from Tanaka Kikinzoku Kogyo K.K. in the form of Pt nanoparticles deposited on carbon (TEC10V50E) and the melamine was obtained from Sigma Aldrich. The catalyst solution was heated to 323 K (50° C.) for 2 hours, and cooled to and held at room temperature (293 K-20° C.) for 16 hours in a nitrogen atmosphere to form a catalyst powder. The catalyst powder was then washed 4 times and collected by centrifugation, followed by drying at 323 K (50° C.) for 18 hours to form a catalyst ink. It should be understood that THF was present in the catalyst solution due to the reactivity of chlorine with water and the presence of THF may not be needed for other non-chlorine and/or non-halide functional groups.

Example 3. Synthesis of Cyanuric Chloride Surface Modified Pt/C Catalyst

The cyanuric chloride surface modified Pt/C catalyst was synthesized by first mixing 3.36 grams (mg) of Pt/C particles having 47.2 wt. % Pt with 200 mL of a water—THF solution and 200 mmol of cyanuric chloride to form a catalyst solution. The Pt/C catalyst was obtained from Tanaka Kikinzoku Kogyo K.K. in the form of Pt nanoparticles deposited on carbon (TEC10V50E) and the cyanuric chloride was obtained from Sigma Aldrich. The catalyst solution was heated to 323 K (50° C.) for 2 hours, and cooled to and held at room temperature (293 K-20° C.) for 16 hours in a nitrogen atmosphere to form a catalyst powder. The catalyst powder was then washed 4 times and collected by centrifugation, followed by drying at 323 K (50° C.) for 18 hours to form a catalyst ink. It should be understood that THF was present in the catalyst solution due to the reactivity of chlorine with water and the presence of THF may not be needed for other non-chlorine and/or non-halide functional groups.

Example 4. Preparation of Fuel Cells

The fuel cells that were tested had anode electrodes with a surface area of 4 $cm^2$, a Pt loading of 0.05 $mg/cm^2$, cathode electrodes with a surface area of 4 $cm^2$, a Pt loading of 0.40 $mg/cm^2$, an ionomer/carbon ratio of 0.7, a membrane of Nafion NR211, and a SIGRACET 22BB gas diffusion layer. Also, testing of the fuel cells occurred at 80° C. and a relative humidity of 90%.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should also be understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure. In addition, Attachment A, filed with the present disclosure, is incorporated herein in its entirety by reference.

What is claimed is:

1. A catalyst comprising:

a metal containing particle on a carbon support (Me/C particle), the Me/C particle having an oxygen reduction catalytic activity; and a surface of the Me/C particle modified with a plurality of immobilized triazine rings having at least one halogen functional group selected from $R_1$, $R_2$, and $R_3$, and where $R_1$ is bonded to the carbon support and selected from the group consisting of O, COO, NH, $NR_4$, S, an alkylamino group having 1 to 10 carbon atoms, an alkyl group having 1 to 10 carbon atoms, and a perfluoro alkyl group having 1 to 10 carbon atoms, and where $R_4$ is a functional group.

2. The catalyst according to claim 1, wherein the plurality of immobilized triazine rings have a chemical structure selected from at least one of:

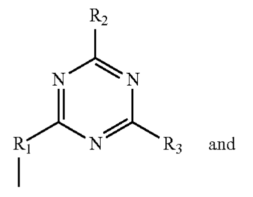

and

-continued

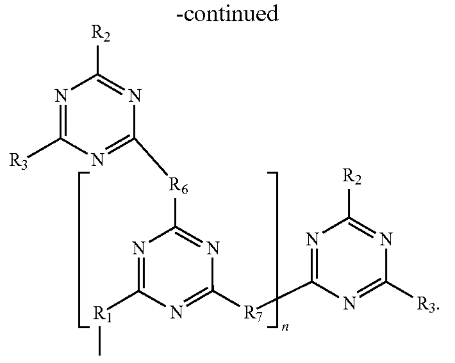

3. The catalyst according to claim 2, wherein the plurality of immobilized triazine rings have the chemical structure:

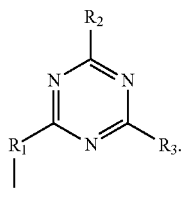

4. The catalyst according to claim 3, wherein $R_2$ and $R_3$ are independently selected from the group consisting of $NH_2$, $NR_4H$, $NR_4R_5$, H, OH, F, Cl, Br, I, SH, an alkylamino group having 1 to 10 carbon atoms, an alkyl group having 1 to 10 carbon atoms, and a perfluoro alkyl group having 1 to 10 carbon atoms, and where $R_5$ is a functional group.

5. The catalyst according to claim 2, wherein the plurality of immobilized triazine rings have the chemical structure:

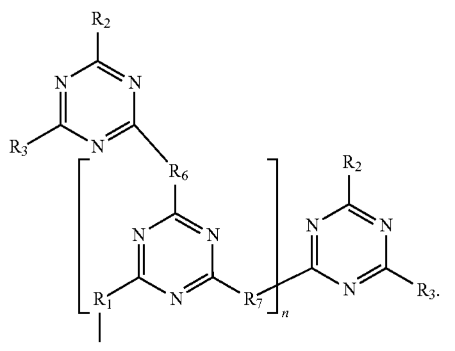

6. The catalyst according to claim 5, wherein $R_2$ and $R_3$ are independently selected from the group consisting of $NH_2$, $NR_4H$, $NR_4R_5$, H, OH, F, Cl, Br, I, SH, an alkylamino group having 1 to 10 carbon atoms, an alkyl group having 1 to 10 carbon atoms, and a perfluoro alkyl group having 1 to 10 carbon atoms, and where $R_5$ is a functional group.

7. The catalyst according to claim 6, wherein $R_4$ and $R_5$ are independently selected from the group consisting of an alkylamino group having 1 to 10 carbon atoms, an alkyl group having 1 to 10 carbon atoms, a perfluoro alkyl group having 1 to 10 carbon atoms, OH, F, Cl, Br, I, SH, and $NH_2$.

8. The catalyst according to claim 7, wherein $R_6$ and $R_7$ are independently selected from the group consisting of O, S, COO, CO, CONH, $CONR_8$, and $R_8$ is selected from the group consisting of an alkylamino group having 1 to 10 carbon atoms, or an alkyl group having 1 to 10 carbon atoms, a perfluoro alkyl group having 1 to 10 carbon atoms, OH, F, Cl, Br, I, SH, and $NH_2$.

9. The catalyst according to claim 7, wherein n is between 1 and 10000, inclusive.

10. The catalyst according to claim 1, wherein the plurality of immobilized triazine rings have a chemical structure comprising:

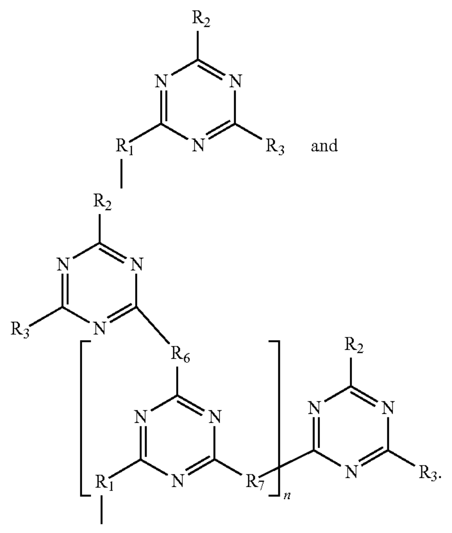

and

11. The catalyst according to claim 10, wherein:

$R_2$ and $R_3$ are independently selected from the group consisting of $NH_2$, $NR_4H$, $NR_4R_5$, H, OH, F, Cl, Br, I, SH, an alkylamino group having 1 to 10 carbon atoms, an alkyl group having 1 to 10 carbon atoms, and a perfluoro alkyl group having 1 to 10 carbon atoms, and where $R_4$ and $R_5$ are functional groups;

$R_4$ and $R_5$ are independently selected from the group consisting of an alkylamino group having 1 to 10 carbon atoms, an alkyl group having 1 to 10 carbon atoms, a perfluoro alkyl group having 1 to 10 carbon atoms, OH, F, Cl, Br, I, SH, and $NH_2$;

$R_6$ and $R_7$ are independently selected from the group consisting of O, S, COO, CO, CONH, $CONR_8$, and $R_8$ is selected from the group consisting of an alkylamino group having 1 to 10 carbon atoms, or an alkyl group having 1 to 10 carbon atoms, a perfluoro alkyl group having 1 to 10 carbon atoms, OH, F, Cl, Br, I, SH, and $NH_2$; and n is between 1 and 10000, inclusive.

12. A catalyst comprising:

a metal containing particle on a carbon support (Me/C particle), the Me/C particle having an oxygen reduction catalytic activity;

a surface of the Me/C particle modified with a plurality of immobilized triazine rings having at least three functional groups $R_1$, $R_2$, and $R_3$, with at least one of R1, R2, and R3 being a halogen functional group;

$R_1$ is bonded to the Me/C particle and selected from the group consisting of O, COO, NH, $NR_4$, S, an alkylamino group having 1 to 10 carbon atoms, an alkyl group having 1 to 10 carbon atoms, and a perfluoro alkyl group having 1 to 10 carbon atoms, and where $R_4$ is a functional group; and $R_2$ and $R_3$ are independently selected from the group consisting of $NH_2$, $NR_4H$, $NR_4R_5$, H, OH, F, Cl, Br, I, SH, an alkylamino group having 1 to 10 carbon atoms, an alkyl group having 1 to 10 carbon atoms, and a perfluoro alkyl group having 1 to 10 carbon atoms, and where $R_5$ is a functional group.

13. The catalyst according to claim 12, wherein the plurality of immobilized triazine rings have the chemical structure:

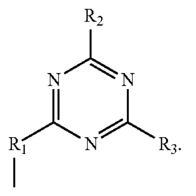

14. The catalyst according to claim 12, wherein the plurality of immobilized triazine rings have the chemical structure:

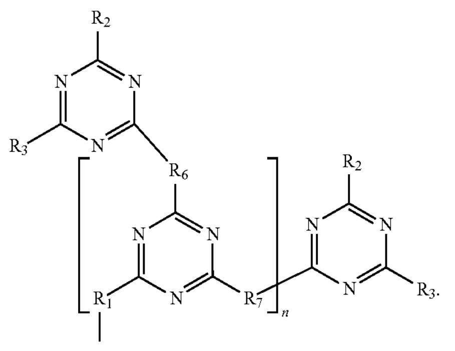

15. The catalyst according to claim 14, wherein $R_2$ and $R_3$ are independently selected from the group consisting of $NH_2$, $NR_4H$, $NR_4R_5$, H, OH, F, Cl, Br, I, SH, an alkylamino group having 1 to 10 carbon atoms, an alkyl group having 1 to 10 carbon atoms, and a perfluoro alkyl group having 1 to 10 carbon atoms.

16. The catalyst according to claim 15, wherein $R_4$ and $R_5$ are independently selected from the group consisting of an alkylamino group having 1 to 10 carbon atoms, an alkyl group having 1 to 10 carbon atoms, a perfluoro alkyl group having 1 to 10 carbon atoms, OH, F, Cl, Br, I, SH, and $NH_2$.

17. The catalyst according to claim 16, wherein $R_6$ and $R_7$ are independently selected from the group consisting of O, S, COO, CO, CONH, $CONR_8$, and $R_8$ is selected from the group consisting of an alkylamino group having 1 to 10 carbon atoms, or an alkyl group having 1 to 10 carbon atoms, a perfluoro alkyl group having 1 to 10 carbon atoms, OH, F, Cl, Br, I, SH, and $NH_2$.

18. A catalyst comprising:

a platinum containing particle on a carbon support (Pt/C particle), the Pt/C particle having an oxygen reduction catalytic activity;

a surface of the Pt/C particle modified with a plurality of immobilized triazine rings having at least one a halogen functional group and a chemical structure selected from at least one of:

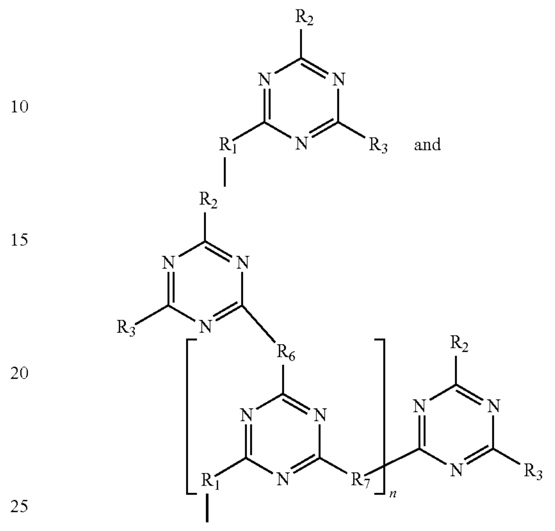

$R_1$ is bonded to the Pt/C particle and selected from the group consisting of O, COO, NH, $NR_4$, S, an alkylamino group having 1 to 10 carbon atoms, an alkyl group having 1 to 10 carbon atoms, and a perfluoro alkyl group having 1 to 10 carbon atoms; and $R_2$ and $R_3$ are independently selected from the group consisting of $NH_2$, $NR_4H$, $NR_4R_5$, H, OH, F, Cl, Br, I, SH, an alkylamino group having 1 to 10 carbon atoms, an alkyl group having 1 to 10 carbon atoms, and a perfluoro alkyl group having 1 to 10 carbon atoms, and where $R_4$ and $R_5$ are functional groups.

19. The catalyst according to claim 18, wherein $R_4$ and $R_5$ are independently selected from the group consisting of an alkylamino group having 1 to 10 carbon atoms, an alkyl group having 1 to 10 carbon atoms, a perfluoro alkyl group having 1 to 10 carbon atoms, OH, F, Cl, Br, I, SH, and $NH_2$.

20. The catalyst according to claim 18, wherein the plurality of immobilized triazine rings have the chemical structure:

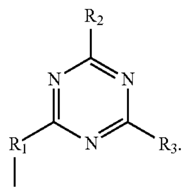

* * * * *